6558X
J. Barron,
Automatic Fan.
Patented June 13, 1831.
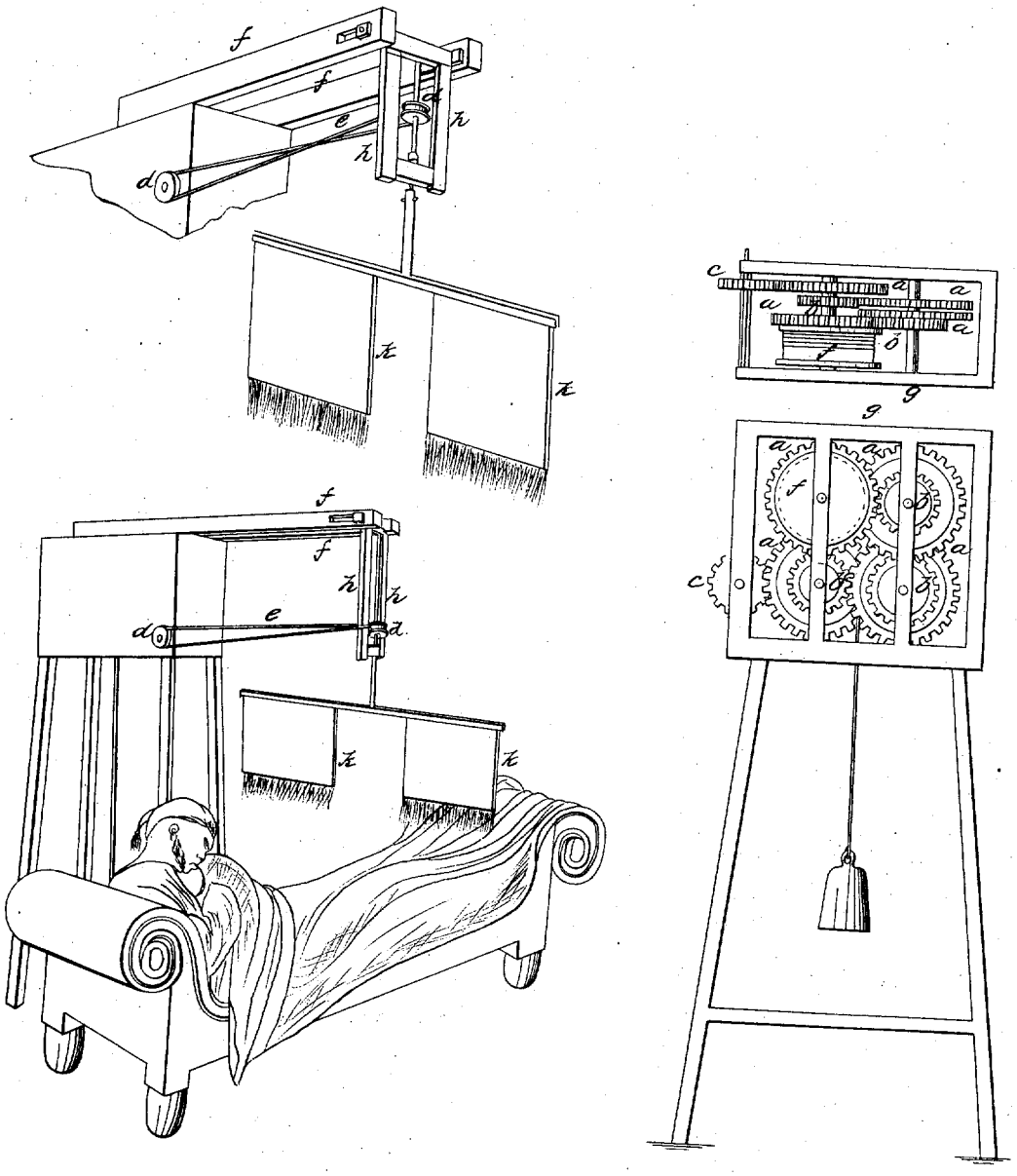
AM. PHOTO-LITHO. CO. N.Y. (OSBORNE'S PROCESS)

The schedule referred to in these Letters Patent and making part of the same containing a description in the words of the said James Barron himself of his improvement on his mechanical fan, patented on the 27th day of November 1830.

Be it known that I, James Barron, of Norfolk, in the County of Norfolk, and State of Virginia, have made an improvement on my mechanical fan, patented on the 27th day of November 1830, which is described in the following manner. The cog wheels; the drum; the cord and weight; with the frame containing them are the same as described in my former patent.
The improvement which I now wish to secure by Letters patent consists of giving motion to the fan or fans by means of two pulleys and a connecting band, instead of the crank vibratory motion as described in my former patent. And for this purpose I fix on the axle of the pinion which contained the crank a horizontal pulley of a proper diameter to give the required motion. From the top of the frame two arms are projected horizontally any convenient distance. Two slots are cut two or three inches near the end of each arm. From these arms is suspended a small frame, having a top bar, two short arms, and two horizontal bars, one near the top and the other at the bottom, in the middle of the two latter a vertical pulley (having collars and turning on gudgeons, works) a band or strap is made to pass round these pulleys, and is made tight by nuts and screws passing through the slots.
The lower end of the axle of the vertical pulley, having a projecting part or shoulder, is inserted into a vertical staff, by means of an opening and pin passing thro' the staff & end of the axle of the vertical pulley. at the lower end of the staff is attached a cross bar or stick on which are placed the fans and shrods or threads for creating a breeze and driving away the flies and moschetos. Operation. The weight having been would up and the machinery put in motion by its descent, the axle on which is placed the last pinion and horizontal pulley is turned; this by means of the band or strap, gives motion to the vertical pulley, the shaft attached to it, and

6558X the fan, &c. What I claim as my invention, and which I wish to secure by letters patent is The before described improvement on my former patent, that is giving motion to the fans &c. by means of two pulleys and a connecting band producing a rotary instead of a crank vibratory motion formerly used.

Witnesses
W. P. Elliot
Will: Webb

James Barron

Exd
MGL

Expounds